United States Patent [19]

Strange

[11] Patent Number: 4,960,347
[45] Date of Patent: Oct. 2, 1990

[54] SHIP-BORNE EMERGENCY OIL CONTAINMENT SYSTEM AND METHOD

[76] Inventor: Booth B. Strange, 11106 Wickway, Houston, Tex. 77042

[21] Appl. No.: 479,259

[22] Filed: Feb. 13, 1990

Related U.S. Application Data

[63] Continuation-in-part of Ser. No. 387,520, Jul. 31, 1989.

[51] Int. Cl.$^5$ .................................... E02B 15/04
[52] U.S. Cl. ........................ 405/63; 405/60; 405/66; 405/65; 405/210; 210/923; 114/77 R; 114/256
[58] Field of Search .............. 405/60, 63–66, 405/72, 12, 210; 210/923, 925, 242.1, 242.3; 114/77 R, 74 R, 256

[56] References Cited

U.S. PATENT DOCUMENTS

| | | | |
|---|---|---|---|
| 2,240,567 | 5/1941 | Meacham et al. | 405/65 |
| 4,133,765 | 1/1979 | Stupica | 210/242.3 |
| 4,241,683 | 12/1980 | Conway | 114/256 X |
| 4,249,834 | 2/1981 | Bouvier | 405/70 |
| 4,290,714 | 9/1981 | Strange | 210/923 X |
| 4,889,447 | 12/1989 | Strange | 114/77 R X |

FOREIGN PATENT DOCUMENTS 8001580  8/1980  PCT Int'l Appl. .................. 405/66

*Primary Examiner*—Dennis L. Taylor
*Assistant Examiner*—Franco S. Deliguori
*Attorney, Agent, or Firm*—William A. Knox

[57] ABSTRACT

This invention teaches that when a section of a tanker is damaged, the ship being far from shore-based help, it is imperative that the liquid cargo be transferred from the ruptured tank to an undamaged tank on the ship as quickly as possible. By doing so, the contents of the damaged tank are less likely to escape in a sufficiently voluminous quantity to seriously befoul the environment. To that end, a normally-empty emergency holding tank is provided on the ship with means to provide for emergency transfer of the liquid cargo from the damaged section into the emergency holding tank. At the same time, the ruptured tank is enshrouded by a flexible barrier curtain to entrap whatever liquid cargo that may have leaked from the damaged tank.

4 Claims, 5 Drawing Sheets

U.S. Patent    Oct. 2, 1990    Sheet 5 of 5    4,960,347
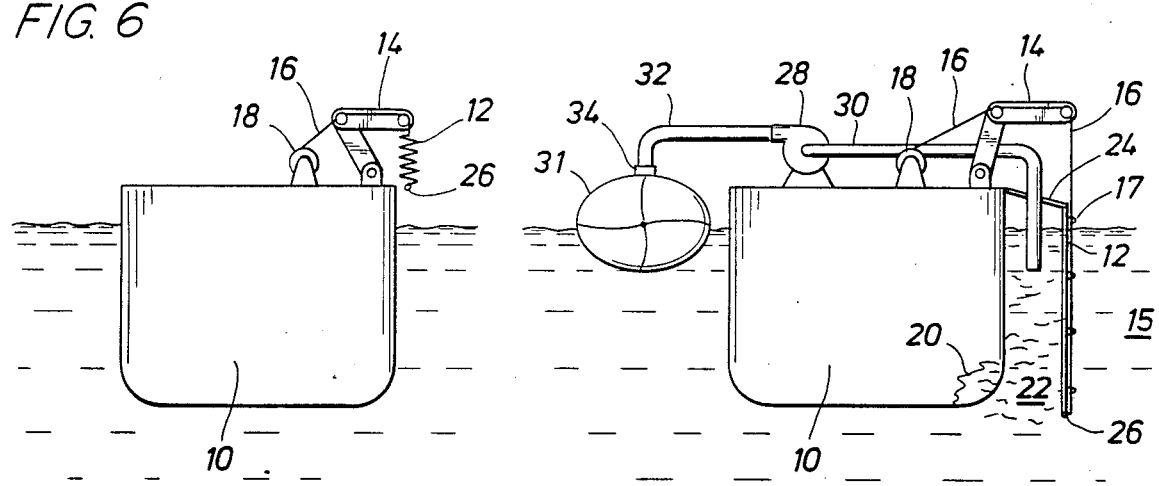
FIG. 6
FIG. 7
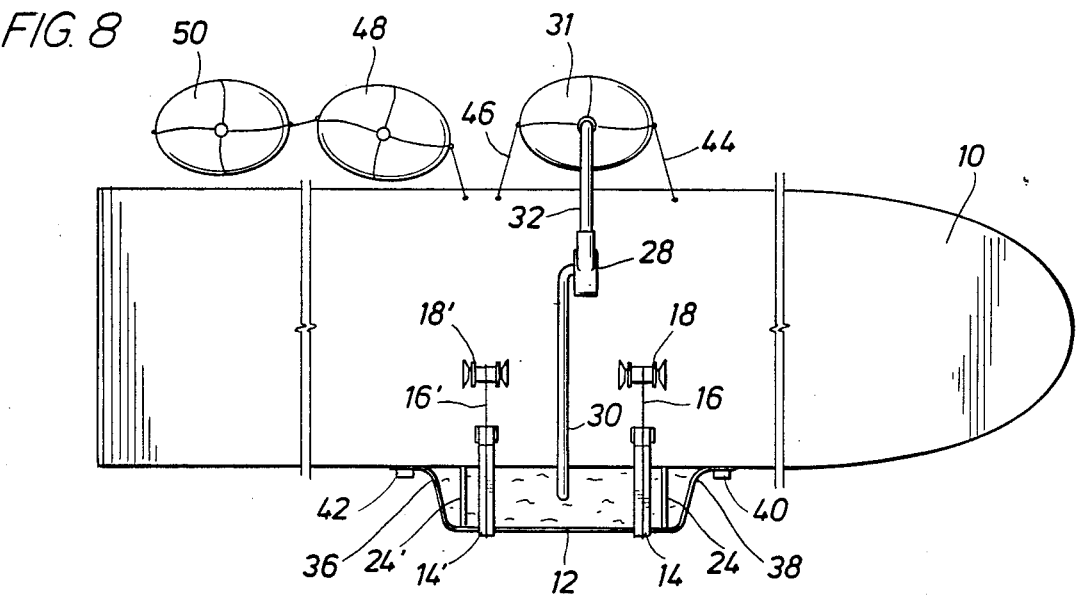
FIG. 8
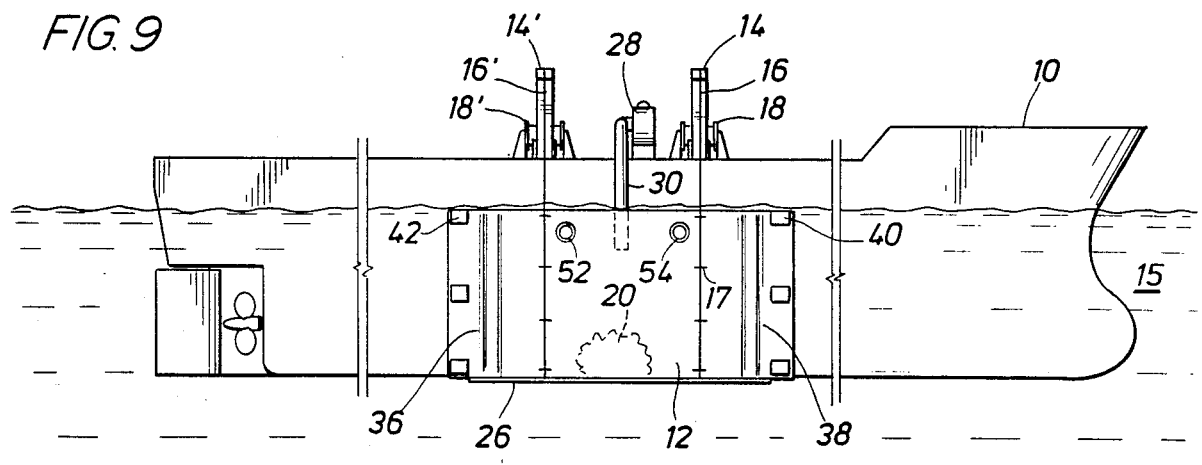
FIG. 9

SHIP-BORNE EMERGENCY OIL CONTAINMENT SYSTEM AND METHOD

RELATION TO OTHER APPLICATIONS

This patent application is a continuation-in-part of my copending patent application Ser. No. 07/387,520, filed July 31, 1989.

FIELD OF THE INVENTION

This invention is concerned with the containment and removal of marine pollution at or near the immediate source, such as a stricken tanker, to prevent further dispersal of the pollution into the environment. This invention is directed to not only containing whatever pollution that may have initially escaped but also to create a water seal in the damaged tank of a ship so that the pollution will not leak into the water in the first place.

DISCUSSION OF THE PRIOR ART

Major spills of polluting material such as crude oil occur infrequently at sea but when they do happen, the results can be catastrophic. The disastrous effects stem not so much from the actual localized flow of the pollution from a point source, but from the uncontrolled widespread dispersal of the material over the water surface and beaches due to wave, wind and current action. If the flow of pollution can be substantially contained and/or shut off at or near the source, the environmental impact of the spill is minimal.

Although the environmental effects of an oil spill are of concern, the economic loss of the natural resource is also important. Once the spill has spread over a large area, even if the thin layer of the scum can be recovered, it becomes so badly emulsified by the water that the scum cannot be economically processed. It is wasted. Recovery of the crude at the source, before it becomes seriously water-contaminated, is essential. For example, the PEMEX oil spill in the Gulf of Mexico several years back, reportedly lost more than 900,000 barrels of oil.

Another problem in handling oil spills is the absence of proper and effective equipment to handle the accident. Historically, it has required days or even weeks to mobilize personnel and equipment and to put them into place. By that time it is often too late.

Most of the presently-known pollution-control equipment is directed to merely skimming the already-dispersed pollution form the water surface and pumping the scum into holding tanks or pits. The equipment typically consists of buoyant plastic or rubber booms. A typical oil-spill boom made by Hurum Marine Inc. of Longueil, Quebec, is their FLEXY 3 oil boom. The curtain has a draft of 24" and a freeboard of 12". The boom is made in 50' sections, any number of which allegedly may be coupled together as required. The boom is handled by small tugs. That sort of boom is of limited use in harbors or relatively protected waters but it is ineffective on the high seas where wave heights of 5' to 15' are not uncommon. The waves of the open ocean wash the floating oil scum over the 12" freeboard of the boom, rendering the boom completely useless, if indeed, the boom itself survive the vicious pounding of the waves. Even in calm water, heavy crude forms large globs of congealed oil. Because of their shallow draft, the curtains slide over the globs rather than raking them in. In the presence of a moderate current, the oil slick washes beneath the containment boom and escapes capture.

Other types of cleanup devices include rope mops, blotters, weir skimmers, oil sorbents, microbial agents and chemical oil dispersants such as supplied, for example, by Abasco Inc. of Houston, Tex. Those techniques may be helpful in cleaning up dispersed pollution in quiet water but are of little use in containing the spill at the source ab initio.

U.S. Pat. No. 4,412,501 teaches a ship-borne oil dispersant procedure and apparatus. The tanker ship carries a leak detector. If a leak is detected, a dispersant is released into the leaking oil, presumably rendering the oil harmless to the environment. Such dispersants are known to be effective for relatively small leaks but have proved to be useless in the case of a massive spill, as was clearly demonstrated during the recent Alaskan oil spill. In fact, some States such as Louisiana do not allow use of chemical dispersants.

It would seem prudent to carry aboard a tanker, a self-contained means for immediately containing and recovering its own leaking liquid cargo. All ships carry emergency fire-fighting equipment, emergency communication equipment and life boats; they should also be required to carry emergency spillage containment and recovery systems.

SUMMARY OF THE INVENTION.

It is an object of my invention to provide a self-contained emergency oil containment system for a ship such as an oil tanker, that will be available for immediate emergency use in the event of a ruptured liquid cargo tank. The system will include means for preventing dispersal of leaking oil or the like, over the water and means for emptying the contents of the leaking tank into an emergency temporary-holding container aboard the ship itself so that the oil cannot leak into the water in the first place.

In accordance with an aspect of this invention, on a tanker ship that has one or more liquid cargo tanks, I provide at least one self-powered, high-volume, pre-primed pump that is dedicated solely to emergency use. The pump intake is fluidly coupled to a suction intake that is inserted through a port in each of the one or more cargo tanks. The suction intake is located below the water line as measured externally of the ship. When the tank is ruptured, the ruptured tank is waterflooded by pumping the contents of the ruptured tank into an emergency temporary-holding container.

In accordance with another aspect of this invention, the each liquid cargo tank is provided with a valved port. Plumbing is provided for interconnecting the pump with any one of the cargo tanks through suction intakes coupled into the valved ports so that any one of the tanks may be selectively emptied of its contents in event of a rupture.

In another aspect of this invention, I provide on the ship, a normally-empty holding tank, dedicated solely to emergency use, for receiving and temporarily holding the contents of a ruptured tank.

In accordance with yet another aspect of this invention, I enshroud the ruptured tank outboard of the ship, with an impermeable barrier curtain. The bottom of the curtain must extend beneath the lowermost edge of the rupture in the tank. The leaking liquid cargo is entrapped in the sump formed between the barrier curtain and the hull of the ship, whence the entrapped pollutant can be pumped into an emergency storage container.

BRIEF DESCRIPTION OF THE DRAWINGS

These and other benefits of my invention will be better appreciated by reference to the appended detailed description and the drawings, wherein:

FIG. 6 is a plan view of the tanker showing only the equipment for handling the barrier curtains;

FIG. 7 is an end view of the oil containment barrier unfurled to entrap leaking oil;

FIG. 8 is a plan view of FIG. 7, and

FIG. 9 is a side view of FIG. 7.

DETAILED DESCRIPTION OF THE PREFERRED EMBODIMENT

As explained supra, it is an object of this invention to minimize leakage from a ruptured cargo tank of a ship such as a tanker. To be truly effective, such a system must be installed aboard the ship itself, ready for immediate emergency use by trained damage-control personnel in event of an accident. The system comprises two aspects: First, means for emptying the contents of a damaged tank into an emergency temporary-holding container; Second, containment means for preventing widespread dispersal of the leakage over the water. FIGS. 1–5 illustrate the first aspect of this invention; FIGS. 6–9 illustrate the second aspect of this invention.

Figure 1:
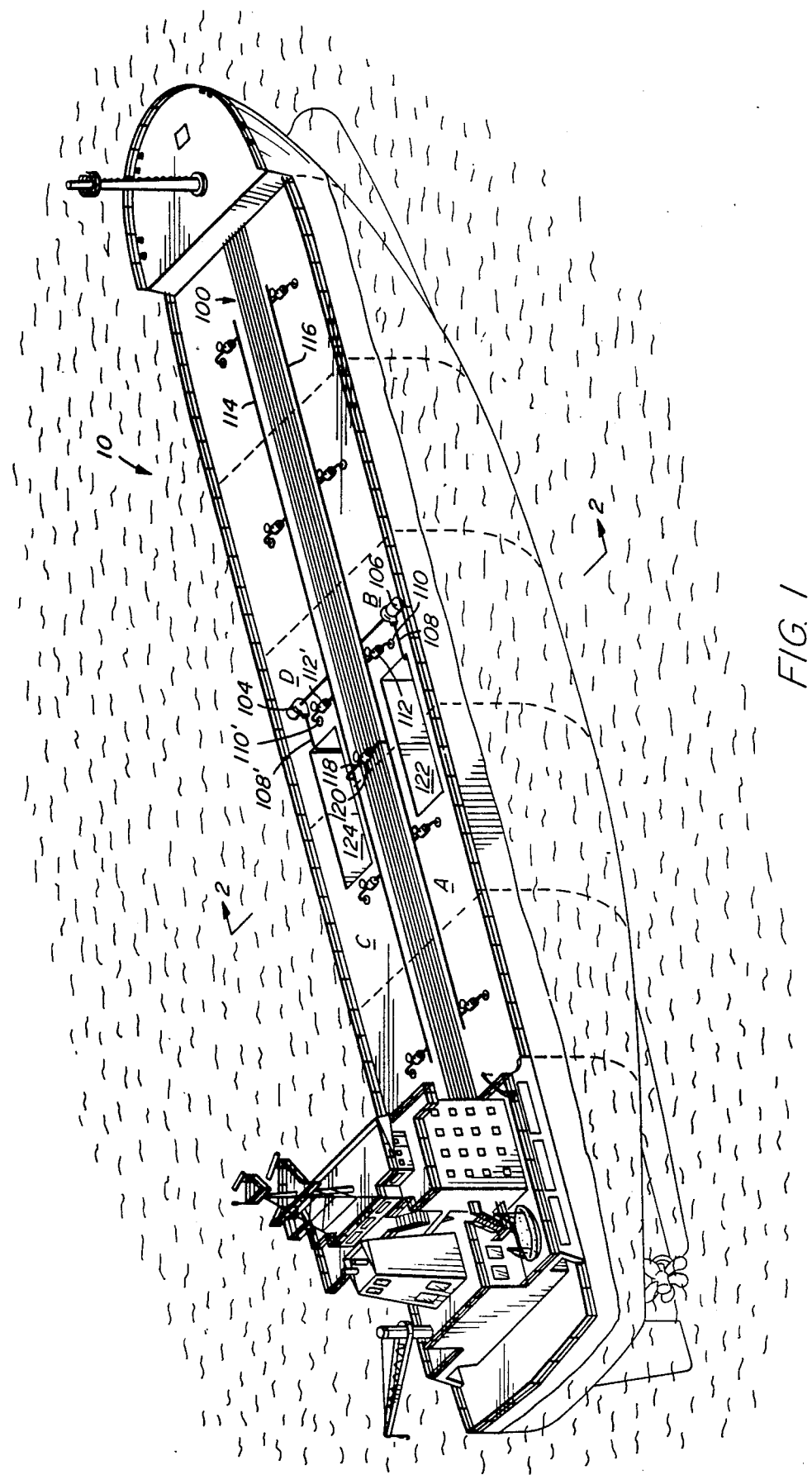
FIG. 1 is a plan view of a tanker ship showing the arrangement of the emergency pumps and plumbing for waterflooding a ruptured liquid cargo tank.

FIG. 1 is a plan view of a tanker ship 10. The ship includes a plurality of liquid cargo tanks such as A, B, C, D, as outlined by the dashed lines. Conventional piping and pumps normally used for loading and offloading liquid cargo are generally shown schematically by 100. It is to be understood that the conventional plumbing forms no part of this invention and, in fact I prefer not even to try to use it for reasons to be explained below with respect to FIGS. 2-5.

On deck of the ship, I provide at least one and preferably two, self-powered, pre-primed, high-volume pumps 104 and 106. The pumps preferably have a capacity of 10,000 to 15,000 gallons per minute and may be driven by suitable diesel engines (not shown). Pumps 104 and 106 are dedicated solely to emergency use.

Each of the liquid cargo tanks is provided with an access port 110 that is equipped with a valve, such as 112, for receiving a suction intake to be described in connection with FIGS. 2-5. All of the tanks are similarly equipped. A large-diameter pipe line 114, serving as a manifold, interconnects all of the liquid cargo tanks on the port side of the ship with a pump 104 having a discharge line 108'. Pipe line 116 similarly interconnects the starboard-side tanks to pump 106 with its discharge line 108. A cross-tie line 118, provided with a valve 120, interconnects pipe lines 114 and 116 so that either or both pumps 104 and 106 may be fluidly coupled selectively to either or both pipe lines.

I provide one or more relatively large, normally-empty emergency temporary-holding tanks, 122 and 124, in the ship, either at or below-deck and near the center of the vessel in a protected location. Alternatively an empty ballast tank, if available, could be pressed into service. The sole function of such tanks is to provide an emergency temporary-holding container for receiving the contents of a ruptured liquid cargo tank. In the Figures, the holding tanks 122 and 124 are shown as open vatlike receptacles by way of example only. They could be located in any convenient location and arranged in any preferred configuration.

Figure 2:
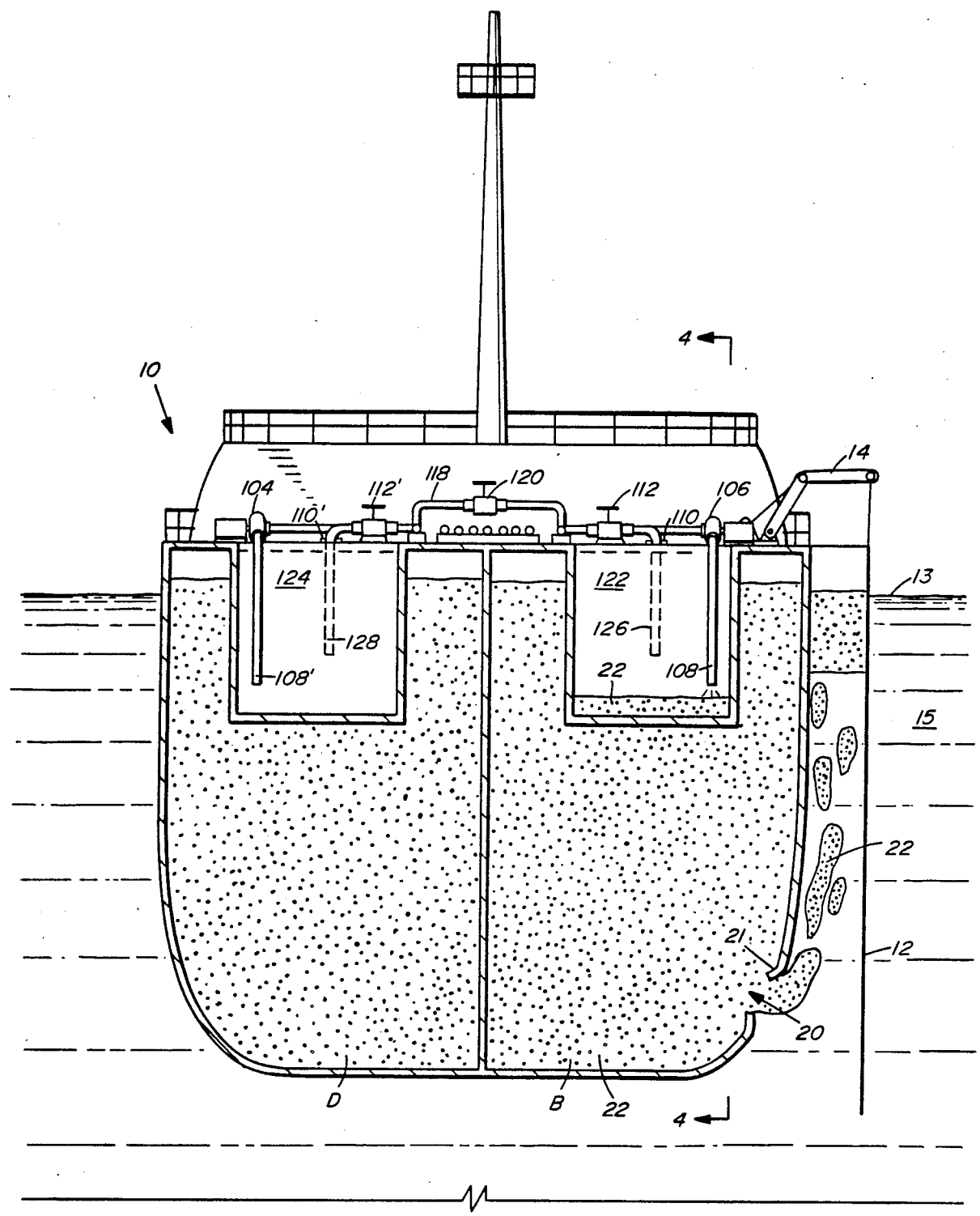
FIG. 2 is a cross section along line 2—2' showing a ruptured cargo tank prior to waterflooding.
Figure 3:
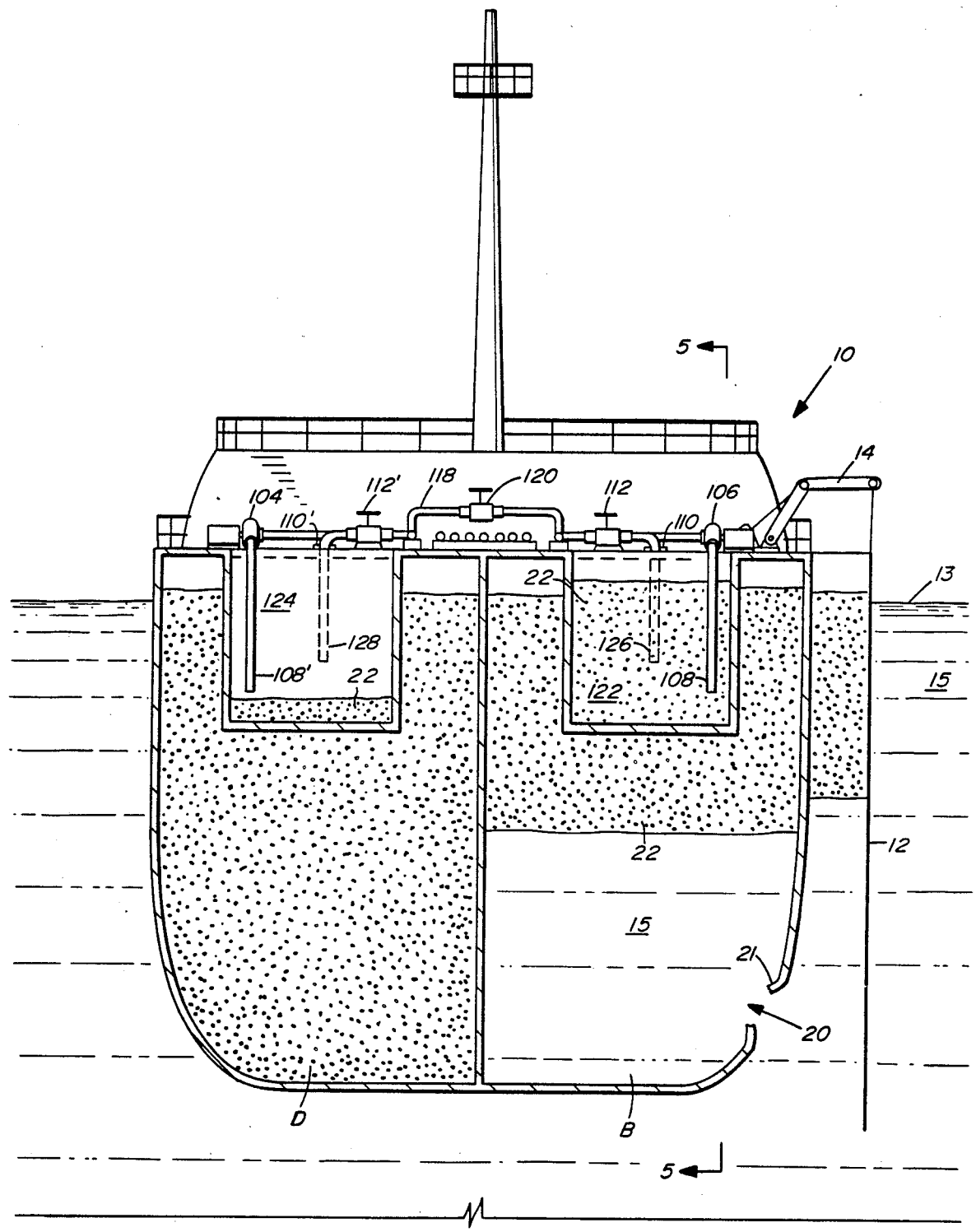
FIG. 3 is a cross section along line 2—2' showing how waterflooding of the tank cuts off further leakage.
Figure 4:
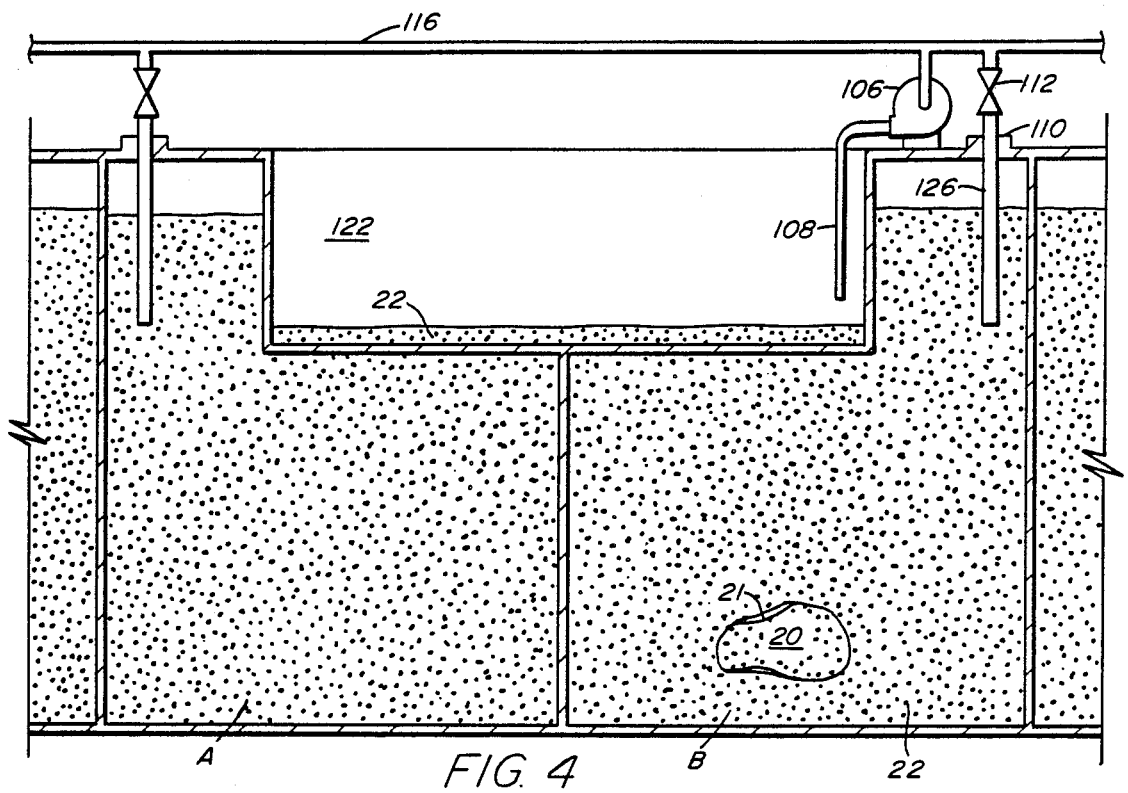
FIG. 4 is a cross section along line 4—4' of FIG. 2.
Figure 5:
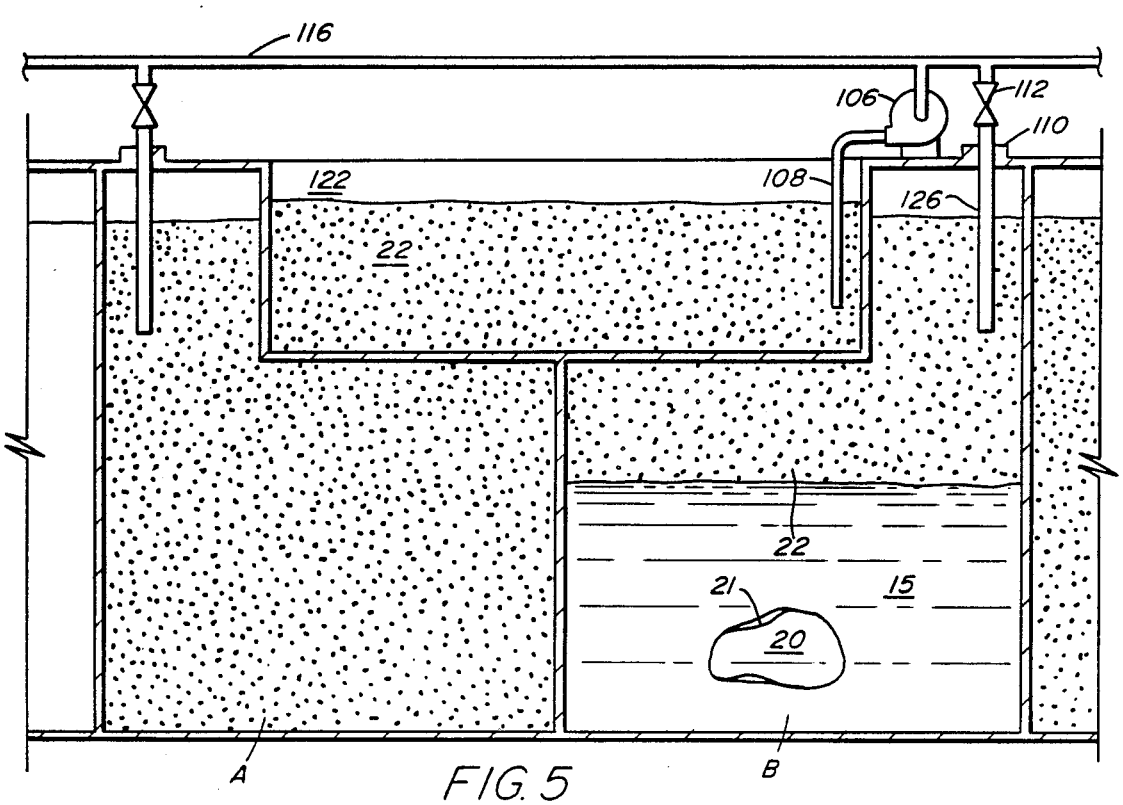
FIG. 5 is a cross section along line 5—5' of FIG. 3.

Refer now to FIGS. 2 and 3 which are cross-sectional views of ship 10 along line 2—2', showing ruptured liquid cargo tank B, intact cargo tank D and emergency temporary-holding tanks 122 and 124. Also refer to FIGS. 4 and 5 which are cross sections along 4—4' and 5—5' of FIGS. 2 and 3 respectively. Suction intakes 126 and 128 are fluidly coupled to valves 112, 112' in ports 110,110' whence they are interconnected with pumps 104 and 106 through pipe lines 114 and 116. Suction intakes 126 and 128 are preferably located at or just below the water line as measured externally of the ship. If desired, the immersion depth of the suction intakes may be adjustable. The pump discharge lines 108, 108' terminate inside normally empty holding tanks 122 and 124.

In the Figures, a hole 20 has been ripped into the side of tank B. The liquid cargo such as oil 22 pours out of hole 20 into the sea water 15 where it is contained by a barrier curtain 12, hung from supports 14, that enshrouds the hole (to be described in detail in connection with FIGS. 6–9 infra). Pump 106 is immediately activated to empty cargo tank B from the top by transferring its contents into temporary-holding tank 122. As the cargo is pumped out, sea water 15, being heavier than oil 22, invades tank B, through hole 20, to waterflood the tank to a level at least above the topmost edge 21 of the rupture 20. At that point, the effluent flowing from the leaking tank is cut off by reason of the water seal as shown in FIG. 3. As holding tank 122 fills up while ruptured cargo tank B is being emptied, valve 120 may be opened so that the discharge out of cargo tank B may be diverted into holding tank 124 through cross tie line 118 as shown in FIG. 3.

It should now be clear why one cannot use the conventional plumbing 100 to empty a ruptured tank. In a normal offloading operation of liquid cargo from an undamaged cargo tank, the entire tank must be emptied clear to the bottom. To that end, the suction intake coupled to the conventional cargo-discharge pumps must reach to the very bottom of a cargo tank. If the tank in question had been stove-in because of grounding, the cargo-discharge pump would simply pump out, through the suction intake, whatever sea water that had accumulated in the bottom of the tank through the gash, but without necessarily pumping out any of the oil. It is essential to empty the tank from the top to take advantage of the differential hydrostatic pressure between water and oil thereby to force the oil continuously upwards to create the required water seal inside the tank above to topmost edge of the gash.

FIGS. 6–9, now to be discussed, show a method for preventing widespread dispersal of the leakage from a ruptured liquid cargo tank. For clarity, the details shown in FIGS. 1–5 are not duplicated in FIGS. 6-9 although common reference numbers are used where appropriate.

FIG. 6 is a cross section of a ship 10 having a furled-up emergency oil containment curtain or barrier 12 suspended from a support 14 of any desired type. Support 14 may, for example, be a suitably modified version of a life boat davit of any well known variety. Barrier 12 is suspended from a cable 16 that may be connected to a winch 18 that may be either hand-operated or electrically or hydraulically powered. The barrier may conveniently be made in segments, each 100 or so feet long, in sufficient number to completely surround the ship if need be. A plurality of supports are needed, perhaps one every 20 feet. In FIG. 8, two supports are shown by way of example, but many more may be provided.

All ships have a draft that is commensurate with the configuration of the ship in accordance with well known naval-architectural principles. Typically, the draft of large tankers may be 40 to 60 feet. Each barrier segment such as 12 must have a draft that is substantially equal to the draft of the ship. The material may be PVC or Neoprene and weighs about 15 pounds per running foot for a 40-foot draft or about 1500 pounds for a 100 foot long segment.

Rather than having a plurality of segments, it would be possible to provide fewer, portable segments that would be available for local disposition around the ship as needed. The segments could be handled by small cranes mounted on tracks disposed along the gunwales of the ship, mounted perhaps, just outside the handrails. Regardless of the arrangement, it is essential that the curtains be instantly deployable in an emergency.

In FIG. 7, I show the supports swung outboard with the barrier unfurled into the water 15 opposite the gash 20 in ship 10 from which oil 22 is exuding (see also, FIGS. 2 and 3). Barrier curtain 12 is spaced apart from the hull by spacer bars such as 24 that may be five to ten feet long, thereby to provide a sump for the accumulated oil between the barrier and the ship's hull. A plurality of weights such as 26 are provided on the bottom of barrier curtain 12 to hold it down in the water. Barrier curtain 12 is attached to cable 16 by a plurality of rings such as 17 through which cable 16 is threaded in the manner of a sail unfurled from a yardarm.

Support 14, curtain 12, cable 16 and spacer bar 24 collectively form means for enshrouding the ruptured tank outboard of the ship with a flexible impermeable barrier.

I furnish one or more high-volume pumps such as 28 aboard the ship. Such pumps may be especially-assigned pumps or one of pumps 104 or 106 of FIG. 1 may be substituted. A suction pipe such as 30 reaches from pump 28 into the sump region between the barrier curtain and the hull for pumping out the effluent 22.

If the discharge from pump 28 cannot be transferred into the temporary-holding tank previously described or into an empty ballast tank, inflatable buoyant oil storage bags such as 31 may be used. Commercially available bags of 2500-gallon capacity or more are available from Abasco Inc. of Houston, Tex. Such bags, when collapsed, take little space and may be carried aboard a tanker in large numbers for emergency use. If used, as each bag such as 31 is filled with effluent from discharge pipe 32 through bag fluid-inlet 34, it may be sealed and left to float in the water behind the ship, tethered thereto by lines 44 and 46 as shown at 48 and 50, FIG. 8.

FIG. 8 is a plan view of FIG. 7. Here, two supports 14 and 14' and two line handling winches 18 and 18' are shown but many more may be used. Barrier curtain 12 has laterally disposed ends 36 and 38 that may be mechanically sealed to intact portions of the ship's hull such as by electromagnetic devices 40 and 42 which may be coupled to a source of electric power aboard the ship.

FIG. 9 is a side view of FIG. 7 showing barrier curtain 12 enclosing the leaking oil. In addition to the elements previously shown in the FIGS., barrier curtain 12 may be provided with quick disconnect fittings 52 and 54. When a relief ship arrives to assist the stricken tanker, the pumps of the relief vessel can be coupled to the fittings 52 and 54 to continue salvage of the spillage without disturbing the integrity of the seal of barrier 12.

In operation, upon discovery of a ruptured liquid cargo tank, the emergency transfer pumps 104 and 106 are immediately started and interconnected with the damaged cargo tank through the pipelines 114 and 116. A valve, such as 112, in a port such as 110, appropriate to the damaged tank or tanks is opened. The appropriate suction intake such as 126 is positioned below the level of the water surface 13 as measured externally of the ship 10. The content of the damaged tank is emptied into one or both emergency temporary-holding tanks 122 and 124 to allow formation of a water seal above the topmost edge 21 of the gash 20 by waterflooding the ruptured cargo tank as quickly as possible. Concurrently, the barrier curtains 12 are deployed to enshroud the damaged tank outboard of the ship to entrap whatever portion of the liquid cargo 22 that may have leaked into water 15. The entrapped spillage is transferred into temporary storage means to prevent further dispersal over the water.

There will be many variations of my invention that may be required in order to accommodate the equipment to various ship configurations and tonnages but which will nevertheless fall within the scope and spirit of my teachings which are limited only by the appended claims. Although this invention is primarily applicable to oil tankers by way of example, it may also be applied to any ship carrying liquid cargo that is potentially capable of contaminating the environment. In this disclosure, emphasis was placed upon containing oil leakage from tank damage due to a ship running aground on rocks or reefs or to a collision with another ship or with icebergs. This system would also be useful in protecting against any sort cargo-tank leakage or to drippings from fill-discharge pipes and hose fittings that might occur when taking on or offloading liquid cargo at a terminal or between ships at sea.

I CLAIM AS MY INVENTION:

1. In a tanker ship immersed to its water line in water, said ship having a hull that includes a plurality of liquid cargo tanks, each tank being equipped with an access port, a method for minimizing water pollution from any one of said plurality of tanks carrying a liquid cargo that has suffered a rupture, comprising:

providing at least one pump on said ship dedicated solely to emergency use, said pump being fluidly coupled to a suction intake;

inserting said suction intake through the access port of said ruptured tank;

locating the suction intake inside the ruptured tank, but just below the water line as measured externally of the ship; and forming a water seal in the ruptured tank by waterflooding the ruptured tank to at least a level above the topmost edge of the rupture by transferring liquid cargo through said suction intake by said pump from the ruptured tank into an emergency temporary-holding container.

2. The method of claim 1, wherein:

said at least one pump is a self-powered, pre-primed, high-volume pump unit including plumbing for fluidly interconnecting said pump unit with any one of said plurality of liquid cargo tanks through suction intakes inserted through the respective access ports of said plurality of tanks.

3. The method of claim 2 wherein:

said emergency temporary holding container is a normally empty tank installed in a protected location on said ship for use solely in receiving the liquid cargo from a ruptured tank.

4. The method of claim 3, comprising the further step of:

concurrently enshrouding the ruptured tank, outboard of said ship, with a flexible impermeable barrier curtain, the bottom of said curtain extending at least beneath the lowermost edge of the rupture, thereby to create a sump between said curtain and the hull of said ship for entrapping liquid cargo leaking from said ruptured tank into the surrounding water; and transferring the entrapped liquid cargo into an emergency storage container.

* * * * *